United States Patent
Burger et al.

(10) Patent No.: US 10,409,618 B2
(45) Date of Patent: Sep. 10, 2019

(54) IMPLEMENTING VM BOOT PROFILING FOR IMAGE DOWNLOAD PRIORITIZATION

(71) Applicant: International Business Machines Corporation, Armonk, NY (US)

(72) Inventors: Kenneth J. Burger, Rochester, MN (US); Eric P. Fried, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 226 days.

(21) Appl. No.: 15/209,683

(22) Filed: Jul. 13, 2016

(65) Prior Publication Data
US 2018/0018183 A1    Jan. 18, 2018

(51) Int. Cl.
G06F 9/44    (2018.01)
G06F 9/455    (2018.01)
G06F 9/4401    (2018.01)

(52) U.S. Cl.
CPC ........ G06F 9/4406 (2013.01); G06F 9/45558 (2013.01); *G06F 2009/45575* (2013.01)

(58) Field of Classification Search
CPC .............. G06F 9/44; G06F 9/45; G06F 9/455
See application file for complete search history.

(56) References Cited

U.S. PATENT DOCUMENTS

| | | | |
|---|---|---|---|
| 8,793,684 B2 | 6/2014 | Breitgand et al. | |
| 8,856,086 B2 | 10/2014 | Chao et al. | |
| 2010/0058045 A1* | 3/2010 | Borras | G06F 9/4401 713/2 |
| 2012/0060153 A1* | 3/2012 | Bealkowski | G06F 9/45558 718/1 |
| 2012/0084775 A1* | 4/2012 | Lotlikar | G06F 9/45558 718/1 |
| 2013/0290694 A1 | 10/2013 | Civilini et al. | |
| 2014/0172783 A1 | 6/2014 | Suzuki et al. | |
| 2016/0105280 A1* | 4/2016 | Kinshumann | H04L 9/0825 713/166 |
| 2016/0170784 A1* | 6/2016 | Liguori | G06F 9/45558 718/1 |

OTHER PUBLICATIONS

Zhang, Z.; "VMThunder: Fast Provisioning of Large-Scale Virtual Machine Clusters"; IEEE Transactions on Parallel & Distributed Systems, vol. 25, No. 12, pp. 3328-3338, Dec. 2014.
Anonymously; "Fast virtual machine boot utilizing a network image", http://ip.com/IPCOM/000225783; Mar. 5, 2013.
Microsoft; "Rapid Operating System Profile Switching"; http://ip,com/IPCOM/000177876; Jan. 8, 2009.
Anonymously; "Method for Efficient Image Distribution over a Cloud Environment"; http://ip.com/IPCOM/000233940; Jan. 3, 2014.

* cited by examiner

*Primary Examiner* — Phil K Nguyen
(74) *Attorney, Agent, or Firm* — Joan Pennington

(57) ABSTRACT

A method and apparatus are provided for implementing enhanced deployment of a virtual machine (VM) in a cloud environment. VM boot profiling is performed and used for providing VM image download prioritization. The VM boot profiling facilitates the transfer of the earliest needed portions of the VM image first, allowing the VM to boot and begin operating quickly while the later needed portions of the VM image are still transferring.

18 Claims, 6 Drawing Sheets

IMPLEMENTING VM BOOT PROFILING FOR IMAGE DOWNLOAD PRIORITIZATION

FIELD OF THE INVENTION

The present invention relates generally to the data processing field, and more particularly, relates to method and apparatus for implementing deployment of a virtual machine (VM) in a cloud environment including VM boot profiling used for the VM image download prioritization.

DESCRIPTION OF THE RELATED ART

In deploying a virtual machine (VM) in a cloud environment, the part of the process that takes the longest is the transfer of the image from some repository, for example, Glance in OpenStack, to the hosting platform, for example to a boot disk from which the VM must boot and operate.

One example technique to mitigate the VM image transfer time includes prefetching VM images to the host. In order to be optimal, all possible images should be stored locally on the host. This becomes more difficult and expensive, both in terms of hardware and bandwidth, as the number and diversity of such images increases; and it makes maintenance of the images difficult.

Another technique to mitigate the VM image transfer time includes caching images closer to the target host. Again, this uses bandwidth and hardware proportional to the number of VM images in play; and it still ultimately requires transfer of the image to the host prior to VM boot.

Another technique to mitigate the VM image transfer time includes using copy-on-write (COW) file systems to allow quick pseudo-cloning of an image already deployed locally. This works great as long as many VMs will share the same image; however, it does not help for the first VM deployed on that host, for which the entire image must still be transferred.

A need exists for an efficient and effective method and apparatus for implementing deployment of a virtual machine (VM) in a cloud environment including transfer of the VM image.

SUMMARY OF THE INVENTION

Principal aspects of the present invention are to provide a method and apparatus for implementing enhanced deployment of a virtual machine (VM) in a cloud environment. Other important aspects of the present invention are to provide such method and apparatus substantially without negative effects and that overcome many of the disadvantages of prior art arrangements.

In brief, a method and apparatus are provided for implementing enhanced deployment of a virtual machine (VM) in a cloud environment. VM boot profiling is performed and used for providing VM image download prioritization. The VM boot profiling facilitates the transfer of the earliest needed portions of the VM image first, allowing the VM to boot and begin operating quickly while the later needed portions of the VM image are still transferring.

In accordance with features of the invention, the VM boot profiling includes high level summary logging of an order and files that are accessed during boot time to be used by other processes to improve image transfer performance for booting.

In accordance with features of the invention, the VM boot profiling includes logging an order and location of files that are accessed at boot time.

In accordance with features of the invention, the VM boot profiling includes organizing the files for optimal transfer at boot time.

In accordance with features of the invention, the VM boot profiling includes marking check points in the boot process.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention. In particular, references to "file" should be broadly considered to include and may be substituted with block, page or any other logical subdivision of data, The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method and apparatus are provided for implementing enhanced deployment of a virtual machine (VM) in a cloud environment. VM boot profiling is performed for providing VM image download prioritization. The VM boot profiling includes high level summary logging the order and files that are accessed during boot time to be used by other processes to improve image transfer performance for booting.

Figure 1:
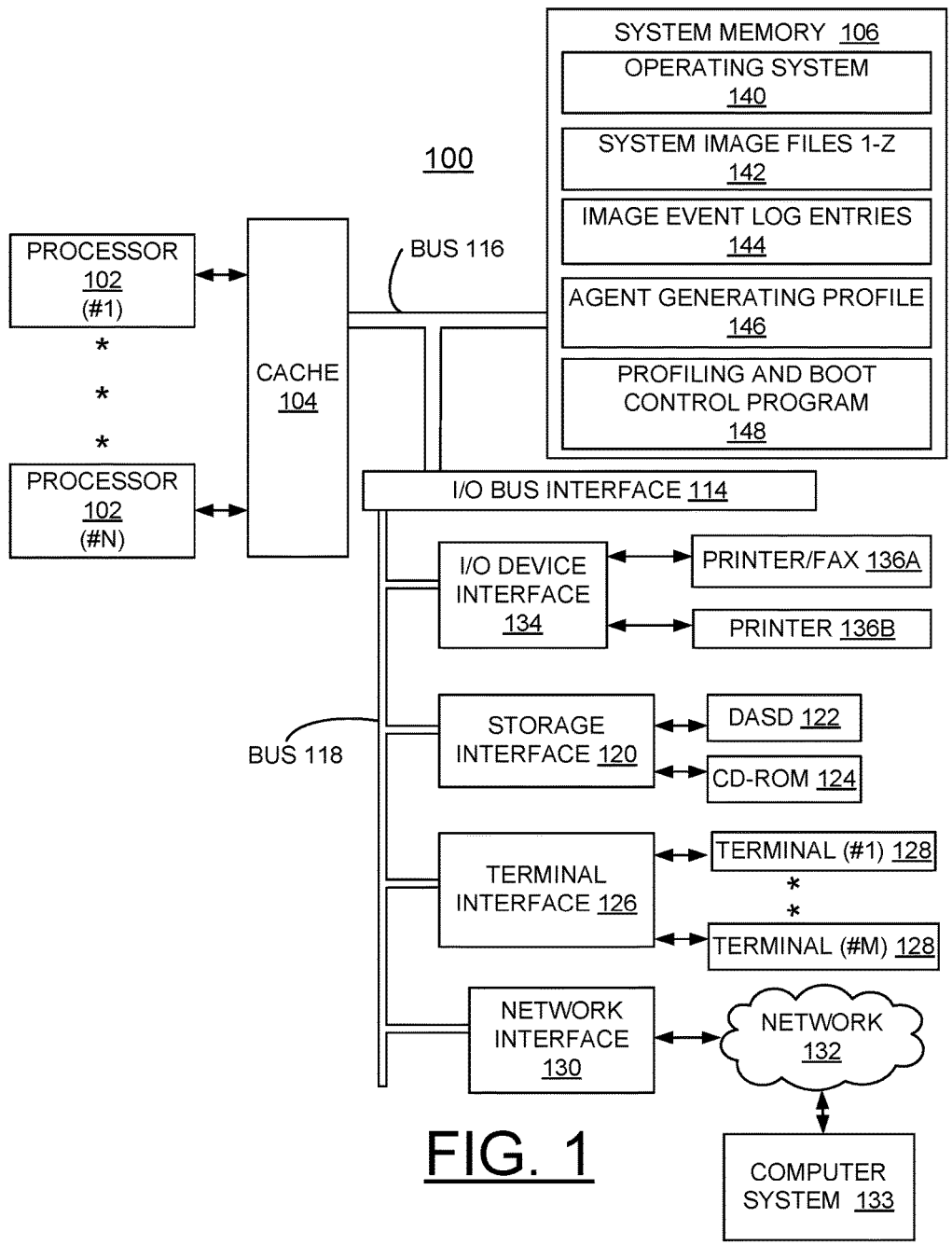
FIG. 1 is a block diagram of an example computer system for implementing enhanced deployment of a virtual machine (VM) in a cloud environment in accordance with the preferred embodiment.

Having reference now to the drawings, in FIG. 1, there is shown a computer system embodying the present invention generally designated by the reference character 100 for implementing enhanced deployment of a virtual machine (VM) in a cloud environment, in accordance with the preferred embodiment. Computer system 100 includes one or more processors 102 or general-purpose programmable central processing units (CPUs) 102, #1-N. As shown, computer system 100 includes multiple processors 102 typical of a relatively large system; however, system 100 can include a single CPU 102. Computer system 100 includes a cache memory 104 connected to each processor 102.

Computer system 100 includes a system memory 106. System memory 106 is a random-access semiconductor memory for storing data, including applications and programs. System memory 106 is comprised of, for example, a dynamic random access memory (DRAM), a synchronous direct random access memory (SDRAM), a current double data rate (DDRx) SDRAM, non-volatile memory, optical storage, and other storage devices.

I/O bus interface 114, and buses 116, 118 provide communication paths among the various system components. Bus 116 is a processor/memory bus, often referred to as front-side bus, providing a data communication path for transferring data among CPUs 102 and caches 104, system memory 106 and I/O bus interface unit 114. I/O bus interface 114 is further coupled to system I/O bus 118 for transferring data to and from various I/O units.

As shown, computer system 100 includes a storage interface 120 coupled to storage devices, such as, a direct access storage device (DASD) 122, and a CD-ROM 124. Computer system 100 includes a terminal interface 126 coupled to a plurality of terminals 128, #1-M, a network interface 130 coupled to a network 132, such as the Internet, local area or other networks, shown connected to another separate computer system 133, and a I/O device interface 134 coupled to I/O devices, such as a first printer/fax 136A, and a second printer 136B.

I/O bus interface 114 communicates with multiple I/O interface units 120, 126, 130, 134, which are also known as I/O processors (IOPs) or I/O adapters (IOAs), through system I/O bus 116. System I/O bus 116 is, for example, an industry standard PCI bus, or other appropriate bus technology.

System memory 106 stores an operating system 140, system image files 1-Z, 142, image event log entries 144, an agent 146 for generating profiles, a profiling and boot control program 148 in accordance with the preferred embodiments.

Figure 2A:
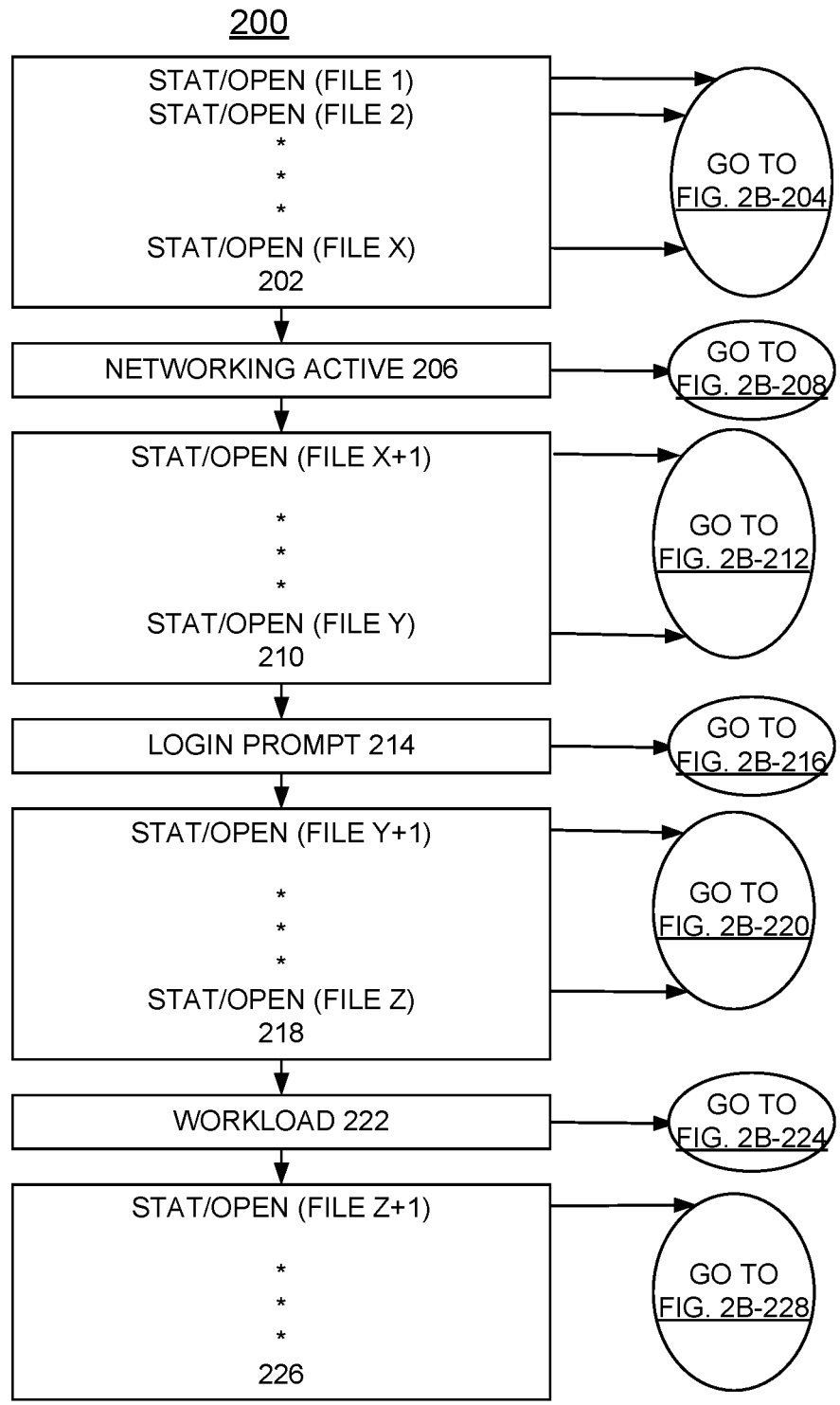
FIGS. 2A and 2B are flow charts together illustrating example operations for implementing virtual machine (VM) profiling in accordance with the preferred embodiment.
Figure 2B:
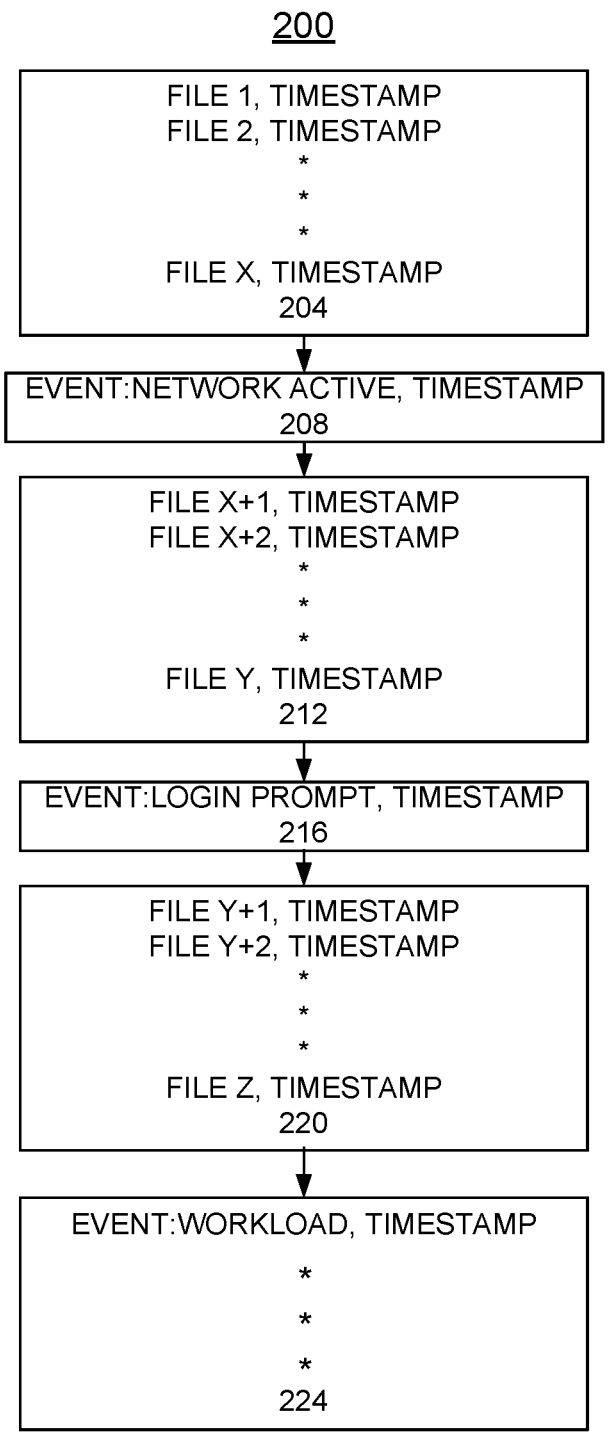

In accordance with features of the invention, in an illustrative embodiment of VM boot profiling such as shown in FIGS. 2A and 2B, instrumenting of low-level file accessors of the operating system in an image in question is performed. In this case, for example assuming a C-based system using stat( ) and open( ) calls, and the idea in general is to find a narrow choke-point that will catch all file accesses during the boot process. As the system boots, the instrumented hooks make a log of each file name as it is accessed, along with the time stamp at which this occurred. Meanwhile, some other mechanism is identifying significant (in the eye of the user) operating system events as they occur. This other mechanism might be instrumentation in some other syscall or program, for example, "ifup" for the network event, some program that runs and watches for a particular condition, such as, a ping loop to detect when networking comes up, or even a human. When a significant event occurs, the mechanism makes an entry in the same log, giving the event a tag for later use, and a timestamp. This continues until all events of interest have occurred.

Referring now to FIGS. 2A and 2B, there are shown example flow charts together illustrating example operations for implementing virtual machine (VM) profiling generally designated by the reference character 200 in accordance with the preferred embodiment. An agent, such as agent 146 observes a VM as it boots, begins work, and identifies which files are accessed during this process. In this manner, the profiling and boot control program 148 of the present invention can break the image into prioritized chunks of almost any granularity, down to the level of individual files, I/O blocks, memory pages, and the like. Using such an agent, the user of the invention, for example, cloud image administrator advantageously performs a mock deploy against this image to generate its chunk profile. This profile is used in subsequent deploys to prioritize the transfer and startup sequence of the VM.

As indicated at a block 202 in FIG. 2A, each of files 1-X is accessed, and as indicated at a block 204 in FIG. 2B, each such access is recorded and timestamped. One example of a mechanism that could achieve this profiling: hook into the VM kernel's low-level stat and/or open syscall and log (to a file, NVRAM, and the like) the file system path from each call. This produces an ordered list of files, which can then be culled for duplicates, preserving only the earliest entry for a given path.

During the profiling mock deploy of FIGS. 2A and 2B, logging events/checkpoints in the same medium, either automatically, for example, each process as it starts, or based on the input of the user, for example, "here's where it finished booting to the point where I could log in"; "here's where network configuration finished"; "here's where I performed a software update"; "here's where I kicked off the workload". These checkpoints can be used to schedule which pieces of the VM's workload advantageously are kicked off based on which segments have finished downloading. As indicated at a block 206 in FIG. 2A, networking is active, and as indicated at a block 208 in FIG. 2B, an event, networking active is recorded and timestamped.

As indicated at a block 210 in FIG. 2A, each of files X+1-file Y is accessed, and as indicated at a block 212 in FIG. 2B, each such access is recorded and timestamped. As indicated at a block 214 in FIG. 2A, a login prompt is identified, and as indicated at a block 216 in FIG. 2B, an event, login prompt is recorded and timestamped.

As indicated at a block 218 in FIG. 2A, each of files Y+1-file Z is started and opened, and as indicated at a block 220 in FIG. 2B, each such access is recorded and timestamped. As indicated at a block 222 in FIG. 2A, a workload is identified, and as indicated at a block 224 in FIG. 2B, an event, workload is recorded and timestamped. As indicated at a block 226 in FIG. 2A, a next file Z+1 is accessed, and the profiling mock deploy operations are continued.

Figure 3A:
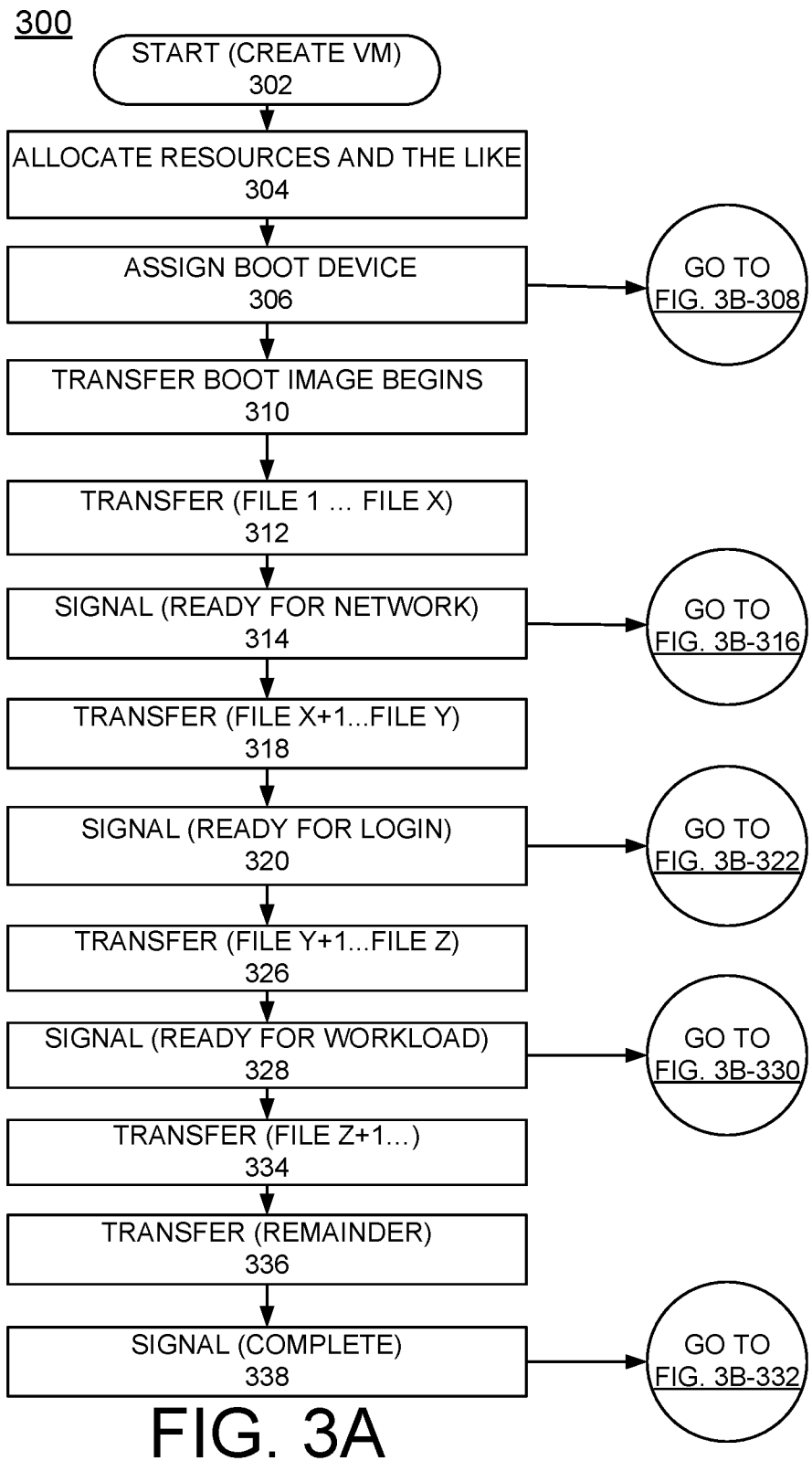
FIGS. 3A and 3B are flow charts together illustrating example operations for implementing virtual machine (VM) coordinated parallel boot process in accordance with the preferred embodiment.
Figure 3B:
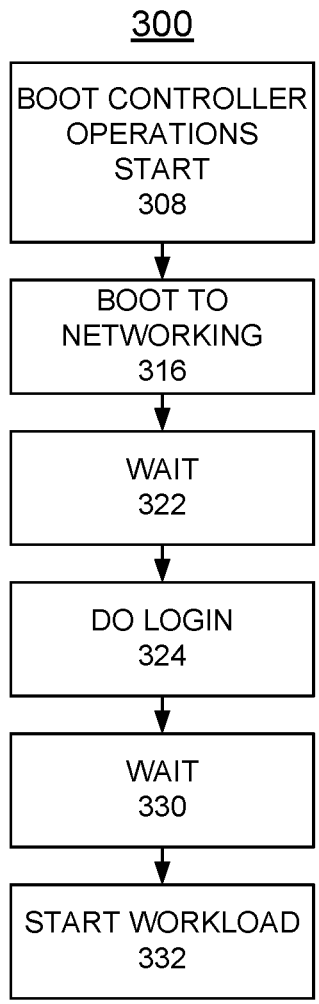

In accordance with features of the invention, during Boot, such as shown in FIGS. 3A and 3B, having created the log file once, via VM boot profiling or a Dummy Run in FIGS. 2A and 2B, now booting VMs is performed many times using this same image. The coordinated boot process runs two things in parallel: uploading the image, and a boot controller agent which kicks off various pieces of work. The image is uploaded in chunks in the order specified by the log file. Whenever the upload comes across an event log entry, it sends a notification to the boot controller agent, which now knows the VM is ready for the one or more pieces of work associated with that event. The boot controller continues to run until all the events of interest have been seen, at which point the boot controller exits. The uploader continues to run until the log file has been entirely traversed. At this point, there are typically one or more remaining chunks that have not been uploaded yet, for example, because they were never touched during the VM boot profiling or Dummy Run. The uploader now uploads those remaining chunks in arbitrary order, and then exits. At this point, the VM looks just like it would have under a normal serial full-upload-then-boot.

Referring to FIGS. 3A and 3B, there are shown example flow charts together illustrating example operations for implementing virtual machine (VM) coordinated parallel boot process generally designated by the reference character 300 in accordance with the preferred embodiment. As indicated at a block 302 in FIG. 3A, operations start to create a VM, resources and the like are allocated as indicated at a block 304. As indicated at a block 306 in FIG. 3A, a boot device is assigned. As indicated at a block 308 in FIG. 3B, the boot controller operations start. As indicated at a block 310 in FIG. 3A, transfer of boot image begins, and transferring files 1-File X is performed as indicated at a block 312. As indicated at a block 314 in FIG. 3A, responsive to an identified event log entry, ready for network is signaled to the boot controller agent. As indicated at a block 316 in FIG. 3B, booting to network is performed. As indicated at a block 318 in FIG. 3A, transferring files X+1-File Y is performed and ready for login is signaled as indicated at a block 320. As indicated at a block 322 in FIG. 3B, waiting is performed, then login is performed as indicated at a block 324.

As indicated at a block 326 in FIG. 3A, transferring files Y+1-File Z is performed and ready for workload is signaled as indicated at a block 328. As indicated at a block 330 in FIG. 3B, waiting is performed, then workload is started as indicated at a block 332. As indicated at a block 334 in FIG. 3A, transferring files Z+1 is performed, remaining files are transferred as indicated at a block 336 and complete is signaled as indicated at a block 338. As indicated at a block 332 in FIG. 3B, starting workload is continued.

Figure 4:
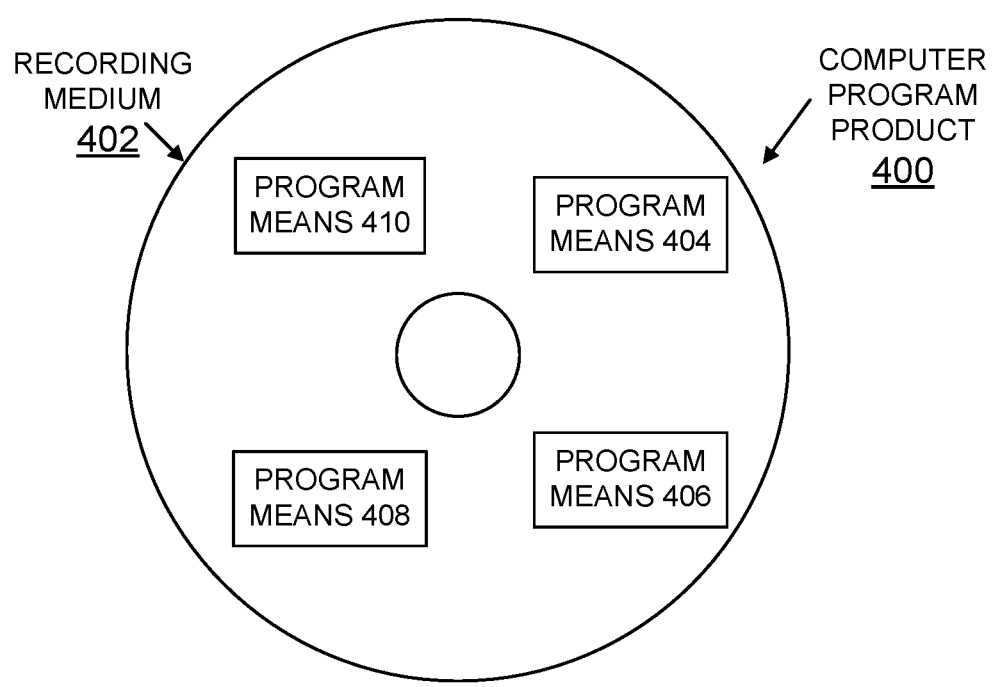
FIG. 4 is a block diagram illustrating a computer program product in accordance with the preferred embodiment.

Referring now to FIG. 4, an article of manufacture or a computer program product 400 of the invention is illustrated. The computer program product 400 is tangibly embodied on a non-transitory computer readable storage medium that includes a recording medium 402, such as, a floppy disk, a high capacity read only memory in the form of an optically read compact disk or CD-ROM, a tape, or another similar computer program product. Recording medium 402 stores program means 404, 406, 408, and 410 on the medium 402 for carrying out the methods for implementing enhanced deployment of a virtual machine (VM) in a cloud environment of the preferred embodiment in the system 100 of FIG. 1.

A sequence of program instructions or a logical assembly of one or more interrelated modules defined by the recorded program means 404, 406, 408, and 410, direct the system 100 for implementing enhanced deployment of a virtual machine (VM) in a cloud environment of the preferred embodiment.

While the present invention has been described with reference to the details of the embodiments of the invention shown in the drawing, these details are not intended to limit the scope of the invention as claimed in the appended claims.

What is claimed is:

1. A computer-implemented method for implementing enhanced deployment of a virtual machine (VM) in a cloud environment, said computer-implemented method for implemented in a computer system including a processor, a profiling and boot control tool tangibly embodied in a non-transitory machine readable medium, said processor using said profiling and boot control tool comprising:

performing VM boot profiling to provide a VM boot profile said VM boot profile including event log entries to start various pieces of work; and using the VM boot profile for providing VM image download prioritization to implement enhanced deployment of the virtual machine (VM) in the cloud environment including transfer of first portions of an VM image first, allowing the VM to boot and begin operating while second portions of the VM image are being transferring, and in parallel using the event log entries to run one or more pieces of work associated with respective event log entries including signaling ready for workload, waiting, and starting workload, and continuing transfer of the VM image wherein performing VM boot profiling to provide the VM boot profile includes logging an order and location of files being accessed at boot time.

2. The method as recited in claim 1, wherein performing VM boot profiling to provide the VM boot profile includes performing a mock deploy against the VM image with high level summary logging of an order and files being accessed during boot time to provide the VM boot profile.

3. The method as recited in claim 1, wherein performing VM boot profiling to provide the VM boot profile includes organizing files of the VM image for optimal transfer at boot time.

4. The method as recited in claim 1, wherein performing VM boot profiling to provide the VM boot profile includes marking check points in the boot process.

5. The method as recited in claim 1, wherein performing VM boot profiling to provide the VM boot profile includes automatically logging defined events in the VM boot profile.

6. The method as recited in claim 1, wherein performing VM boot profiling to provide the VM boot profile includes logging defined events in the VM boot profile based upon user input.

7. The method as recited in claim 1, wherein using the VM boot profile for providing VM image download prioritization includes a coordinated parallel boot process of uploading the VM image and providing a boot controller agent for starting associated work.

8. The method as recited in claim 1, wherein using the VM boot profile for providing VM image download prioritization includes identifying an event log entry in the VM boot profile, and signaling the event to a boot controller agent.

9. The method as recited in claim 1, wherein using the VM boot profile for providing VM image download prioritization includes identifying a ready for workload event log entry in the VM boot profile, signaling a boot controller agent, and said boot controller agent starting workload.

10. A system for enhanced deployment of a virtual machine (VM) in a cloud environment comprising:

a processor;

a profiling and boot control tool tangibly embodied in a non-transitory machine readable medium;

said processor using said profiling and boot control tool to perform the steps of: performing VM boot profiling to provide a VM boot profile, said VM boot profile including event log entries to start various pieces of work; and using the VM boot profile for providing VM image download prioritization to implement enhanced deployment of the virtual machine (VM) in the cloud environment including transfer of first portions of an VM image first, allowing the VM to boot and begin operating while second portions of the VM image are being transferring, and in parallel using the event log entries to run one or more pieces of work associated with respective event log entries including signaling ready for workload, waiting, and starting workload, and continuing transfer of the VM image wherein said processor using said profiling and boot control tool includes an agent logging an order and location of files being accessed at boot time.

11. The system as recited in claim 10, wherein said profiling and boot control tool includes control code tangibly embodied in the non-transitory machine readable medium used for implementing VM image download prioritization.

12. The system as recited in claim 10, wherein said profiling and boot control tool includes an agent performing a mock deploy against the VM image with high level summary logging of an order and files being accessed during boot time to provide the VM boot profile.

13. The system as recited in claim 10, wherein said processor using said profiling and boot control tool includes an agent organizing files of the VM image for optimal transfer at boot time.

14. The system as recited in claim 10, wherein said processor using said profiling and boot control tool includes an agent marking check points in the boot process.

15. The system as recited in claim 10, wherein said processor using said profiling and boot control tool includes an agent automatically logging defined events in the VM boot profile.

16. The system as recited in claim 10, wherein said processor using said profiling and boot control tool includes an agent logging defined events in the VM boot profile based upon user input.

17. The system as recited in claim 10, wherein said processor using said profiling and boot control tool includes an uploader uploading the VM image and a boot controller agent for starting associated work, said uploader and said boot controller agent running in parallel.

18. The system as recited in claim 10, wherein said processor using said profiling and boot control tool includes an uploader uploading the VM image and identifying an event log entry in the VM boot profile, and signaling the event to a boot controller agent.

* * * * *